United States Patent
Hiraoka

(10) Patent No.: US 10,086,676 B2
(45) Date of Patent: Oct. 2, 2018

(54) AIR CONDITIONER FOR CONSTRUCTION MACHINE

(71) Applicant: Caterpillar SARL, Geneva (CH)

(72) Inventor: Ken Hiraoka, Tokyo (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 15/529,673

(22) PCT Filed: Nov. 24, 2015

(86) PCT No.: PCT/EP2015/077447
§ 371 (c)(1),
(2) Date: May 25, 2017

(87) PCT Pub. No.: WO2016/083344
PCT Pub. Date: Jun. 2, 2016

(65) Prior Publication Data
US 2017/0326939 A1 Nov. 16, 2017

(30) Foreign Application Priority Data
Nov. 25, 2014 (JP) .................................. 2014-237437

(51) Int. Cl.
*B60H 3/00* (2006.01)
*B60H 1/00* (2006.01)
(Continued)

(52) U.S. Cl.
CPC ............. *B60H 1/0055* (2013.01); *B60H 1/32* (2013.01); *E02F 9/0858* (2013.01);
(Continued)

(58) Field of Classification Search
CPC .......... B60H 1/0055; B60H 1/32; B60H 1/00; B60H 1/00007; B60H 1/00378;
(Continued)

(56) References Cited

U.S. PATENT DOCUMENTS 3,983,715 A * 10/1976 Hair, Jr. ............. B60H 1/00378
62/243
5,450,894 A * 9/1995 Inoue ................. B60H 1/00285
165/43
(Continued)

FOREIGN PATENT DOCUMENTS

EP 2647771 A1 10/2013
JP 2000-096621 A 4/2000
(Continued)

*Primary Examiner* — Davis Hwu

(57) ABSTRACT

An air conditioner for a construction machine which can ensure the required durability of a supply line and a discharge line, and which can reduce manufacturing costs. The air conditioner has an exterior unit outside the cab and an interior unit on the floor of the cab, the interior unit including an expansion valve disposed at a position above an upper surface of a floor plate of a cab. The expansion valve is connected to an outer device of the air conditioner by a supply line and a discharge line extending along the bottom surface of the floor plate, and bent upward at a passage which is formed in the floor plate. The supply line and the discharge line are fixed by a latching means such as a p-clip disposed in proximity to the passage.

2 Claims, 4 Drawing Sheets

(51) Int. Cl.
    *E02F 9/08*     (2006.01)
    *B60H 1/32*     (2006.01)

(52) U.S. Cl.
    CPC .............. *E02F 9/0866* (2013.01); *B60H 1/00* (2013.01); *E02F 9/08* (2013.01)

(58) Field of Classification Search
    CPC .. B60H 1/00285; E02F 9/0858; E02F 9/0688; E02F 9/08
    USPC .......................................................... 165/42
    See application file for complete search history.

(56) References Cited

U.S. PATENT DOCUMENTS

| | | | |
|---|---|---|---|
| 6,003,593 A * | 12/1999 | Halligan | B60H 1/00378 165/127 |
| 6,038,877 A * | 3/2000 | Peiffer | B60H 1/00007 62/244 |
| 8,967,309 B2 | 3/2015 | Kimura et al. | |
| 2010/0147603 A1 | 6/2010 | Davis et al. | |

FOREIGN PATENT DOCUMENTS

| | | |
|---|---|---|
| JP | 2005-133495 A | 5/2005 |
| JP | 2005-239043 A | 9/2005 |
| JP | 2006-273055 A | 10/2006 |

\* cited by examiner

AIR CONDITIONER FOR CONSTRUCTION MACHINE

CROSS-REFERENCE TO RELATED APPLICATIONS

This application is a national phase application of International Patent Application No. PCT/EP2015/077447 filed Nov. 25, 2015, which claims priority to Japanese Patent Application No. 2014-237437 filed Nov. 25, 2014, both of which are incorporated by reference herein in their entireties for all purposes.

TECHNICAL FIELD

The present invention relates to an air conditioner for a construction machine having a cab with a lower part closed with a floor plate.

BACKGROUND ART

Generally, a hydraulic excavator, a typical example of a construction machine, is roughly configured with a mobile lower traveling body, an upper swivel body mounted on the lower traveling body so as to be able to swivel freely, and a working arm device connected to the upper swivel body so as to be able to move up and down freely. The upper swivel body has a swiveling frame configuring the framing structure thereof, and the swiveling frame is provided with a cab in which an operator rides, an equipment room where various equipment such as an engine and radiator are stored, a counterweight for balancing the weight of a load with respect to the working arm device, and the like.

Most of these hydraulic excavators are usually equipped with an air conditioner for a cab which is configured with an exterior unit disposed outside the cab and an interior unit disposed inside the cab. The exterior unit has a compressor for compressing a refrigerant, a condenser for condensing the refrigerant compressed by the compressor, and a receiver for storing the refrigerant condensed by the condenser. The interior unit, on the other hand, has an expansion valve that expands the refrigerant transferred from the receiver, and an evaporator that evaporates the refrigerant expanded by the expansion valve.

The receiver of the exterior unit and the expansion valve of the interior unit are connected to each other by a supply pipe, so that the refrigerant for cooling the inside is supplied from the receiver of the exterior unit to the expansion valve of the interior unit through the supply pipe. The expansion valve of the interior unit and the compressor of the exterior unit are connected to each other by a discharge pipe, so that the refrigerant circulates between the interior unit and the exterior unit (see Patent Literature 1, for example).

Japanese Patent Application Laid-open No. 2009-274462

DISCLOSURE OF THE INVENTION

Incidentally, this type of interior unit of the air conditioner is usually provided at a rear portion of an upper surface of a floor plate of the cab. The expansion valve of the interior unit is normally provided, in a protruding manner, at a lower end of the interior unit. Therefore, an opening corresponding to the expansion valve is formed in the floor plate. The expansion valve is provided on the inside of the opening of the floor plate, and the supply pipe and the discharge pipe are connected to the expansion valve by a block flange, which is made of an appropriate metal for the purpose of ensuring necessary durability of these pipes.

The present invention was contrived in view of these facts, and a main technical object thereof is to provide an air conditioner for a construction machine that enables acquisition of necessary durability of its supply pipe and discharge pipe without having a block flange between the expansion valve and these pipes, as well as a reduction in manufacturing cost of the construction machine.

As an air conditioner for a construction machine that can achieve the foregoing technical object, the present invention provides an air conditioner for a construction machine having a cab with a lower portion closed with a floor plate, the air conditioner being configured with: an exterior unit disposed outside the cab; and an interior unit disposed inside the cab, wherein the exterior unit includes a compressor for compressing a refrigerant, and a condenser for condensing the refrigerant compressed by the compressor, the interior unit includes an expansion valve for expanding the refrigerant condensed by the condenser, and an evaporator for evaporating the refrigerant expanded by the expansion valve, the expansion valve being disposed at a position above an upper surface of the floor plate and connected to the exterior unit by a supply pipe for supplying the refrigerant condensed by the condenser from the exterior unit to the interior unit and a discharge pipe for discharging the refrigerant evaporated by the evaporator from the interior unit to the exterior unit, the floor plate has a passage opening through which the supply pipe and the discharge pipe pass, the supply pipe and the discharge pipe extending under the floor plate along a bottom surface of the floor plate, bending upward at the passage opening and passing through the passage opening, and the floor plate is provided with latching means in proximity to the passage opening to latch the supply pipe and the discharge pipe.

According to the air conditioner for a construction machine, which is provided by the present invention, the expansion valve is disposed at a position above the upper surface of the floor plate of the cab and connected to the exterior unit by the supply pipe for supplying the refrigerant condensed by the condenser from the exterior unit to the interior unit and the discharge pipe for discharging the refrigerant evaporated by the evaporator from the interior unit to the exterior unit. The passage opening through which the supply pipe and the discharge pipe pass is formed in the floor plate. The supply pipe and the discharge pipe extend under the floor plate along the bottom surface of the floor plate, bend upward at the passage opening and pass through the passage opening. The floor plate is provided with the latching means in proximity to the passage opening to latch the supply pipe and the discharge pipe. According to this configuration, without having a block flange between the expansion valve and the supply and discharge pipes, necessary durability of the supply pipe and the discharge pipe can be ensured. Moreover, the manufacturing cost of the construction machine can be reduced because such a block flange is not required.

BEST MODE FOR CARRYING OUT THE INVENTION

An embodiment of an air conditioner for a construction machine according to the present invention is now described hereinafter with a hydraulic excavator, a typical construction machine, and with reference to the accompanying drawings.

Figure 1:
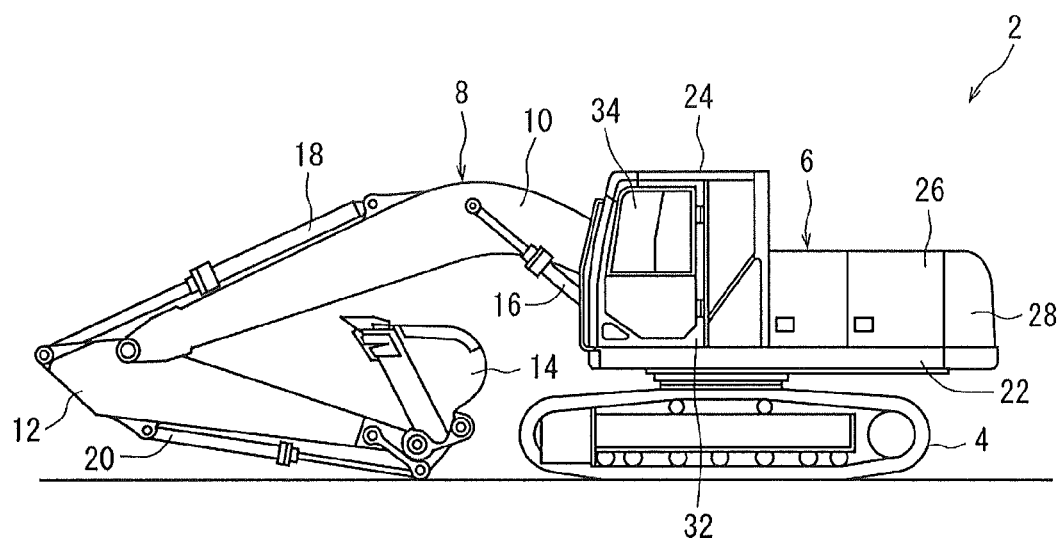
FIG. 1 is a side view of a hydraulic excavator that has an air conditioner configured according to the present invention.

The hydraulic excavator is described with reference to FIG. 1 first. The hydraulic excavator, the entire of which is shown with a reference numeral 2, is roughly configured with a mobile lower traveling body 4, an upper swivel body 6 mounted on the lower traveling body 4 so as to be able to swivel freely, and a working arm device 8 connected to the upper swivel body 6 so as to be able to move up and down freely. At an excavation of soil and the like, the working arm device 8 of the hydraulic excavator 2 is moved up and down and the upper swivel body 6 swivels with respect to the lower traveling body 4, thereby excavating soil and the like.

The working arm device 8 is roughly configured with a boom 10 connected to the front side of the upper swivel body 6 so as to be able to move up and down freely, an arm 12 connected to a tip end of the boom 10 so as to be able to swing freely, an operating tool 14 connected to a tip end of the arm 12 so as to be able to rotate freely, a pair of right and left boom cylinders 16 for moving the boom 10 up and down, an arm cylinder 18 for swinging the arm 12, and an operating tool cylinder 20 for rotating the operating tool 14.

The upper swivel body 6 has a swiveling frame 22 configuring the framing structure thereof. The swiveling frame 22 has a cab 24 in which an operator rides, an equipment room 26 for storing various equipment, a counterweight 28 for balancing the weight of a load with respect to the working arm device 8, and the like. The cab 24 is disposed at the front left side of the swiveling frame 22, the equipment room 26 is disposed at the rear of the cab 24, and the counterweight 28 is disposed at the rear end of the swiveling frame 22. The front-back direction and the lateral direction that are described in the present specification represent the front-back direction and the lateral direction viewed by the operator seated in the cab 24 shown in FIG. 1.

The cab 24 has a framing structure configured with a plurality of pillars made of steel pipes and a beam that connects the plurality of pillars made of steel pipes. The frame of the cab 24 is configured such that a lower portion thereof is closed with a floor plate 30 made of a steel plate, peripheral side surfaces of the same are covered with a door 32, a window 34 and the like, and an upper surface of the same is covered with a roof material having a window. A driver's seat for seating the operator, a plurality of operation devices for operating the hydraulic excavator 2, a display device for displaying machine information necessary for the operator, and the like are provided inside the cab 24.

Figure 2:
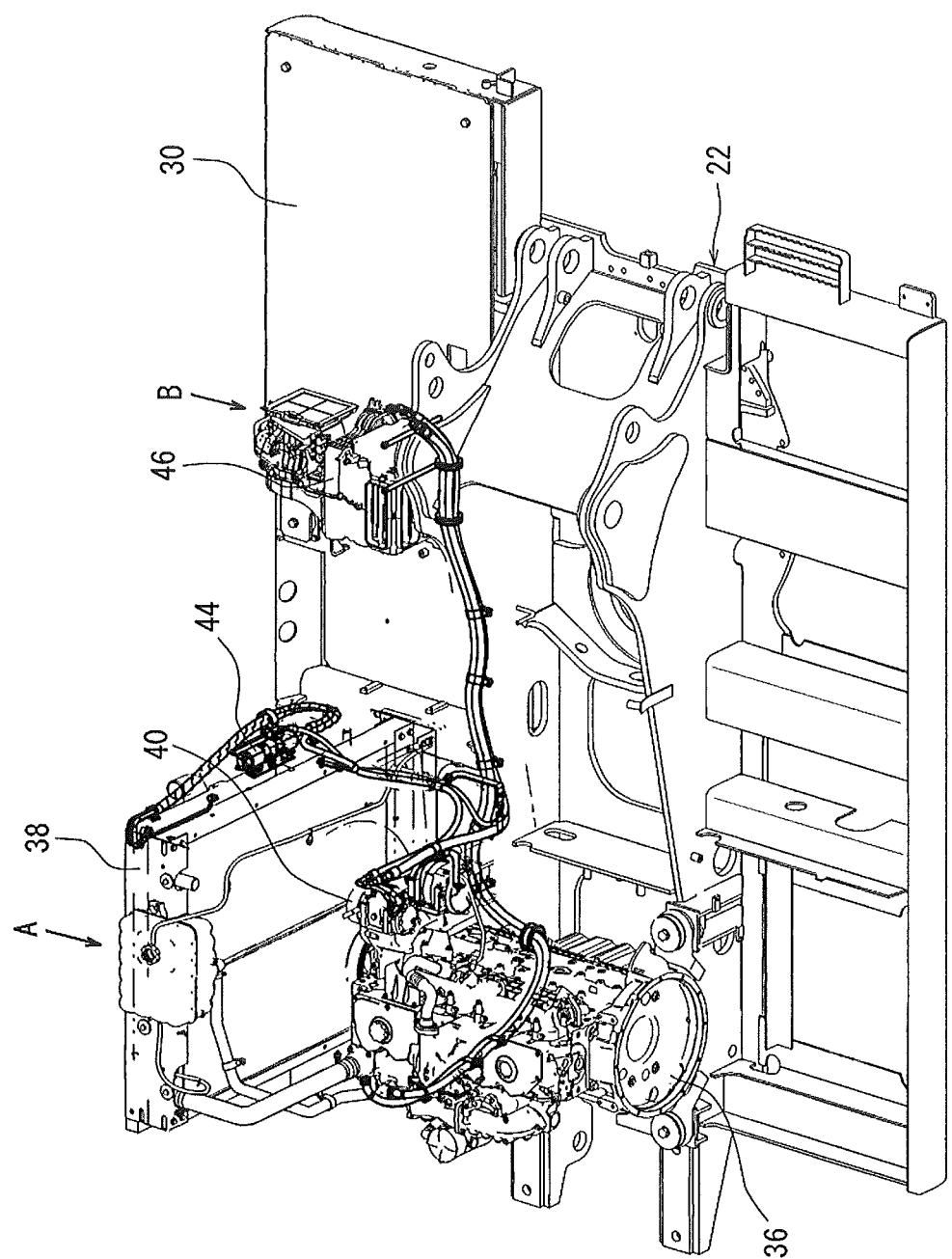
FIG. 2 is a perspective view showing a part of an upper swivel body of FIG. 1 from the upper front side.

As shown in FIG. 2, an engine 36 functioning as a driving source, a radiator 38 for cooling an engine coolant, a hydraulic pump functioning as a hydraulic supply source, and various other equipment are disposed in the equipment room 26. The radiator 38 is disposed at one side in a drive axis direction of the engine 36, and a cooling fan is connected to one side of the drive axis of the engine 36, whereby the engine coolant inside the radiator 38 is cooled by an airflow generated by the cooling fan. Also, the hydraulic pump is connected to the other side of the drive axis of the engine 36 and driven by the engine 36. The pressure oil that is ejected from the hydraulic pump is supplied to a hydraulic actuator, such as the boom cylinder 16, via a control valve or the like.

Figure 3:
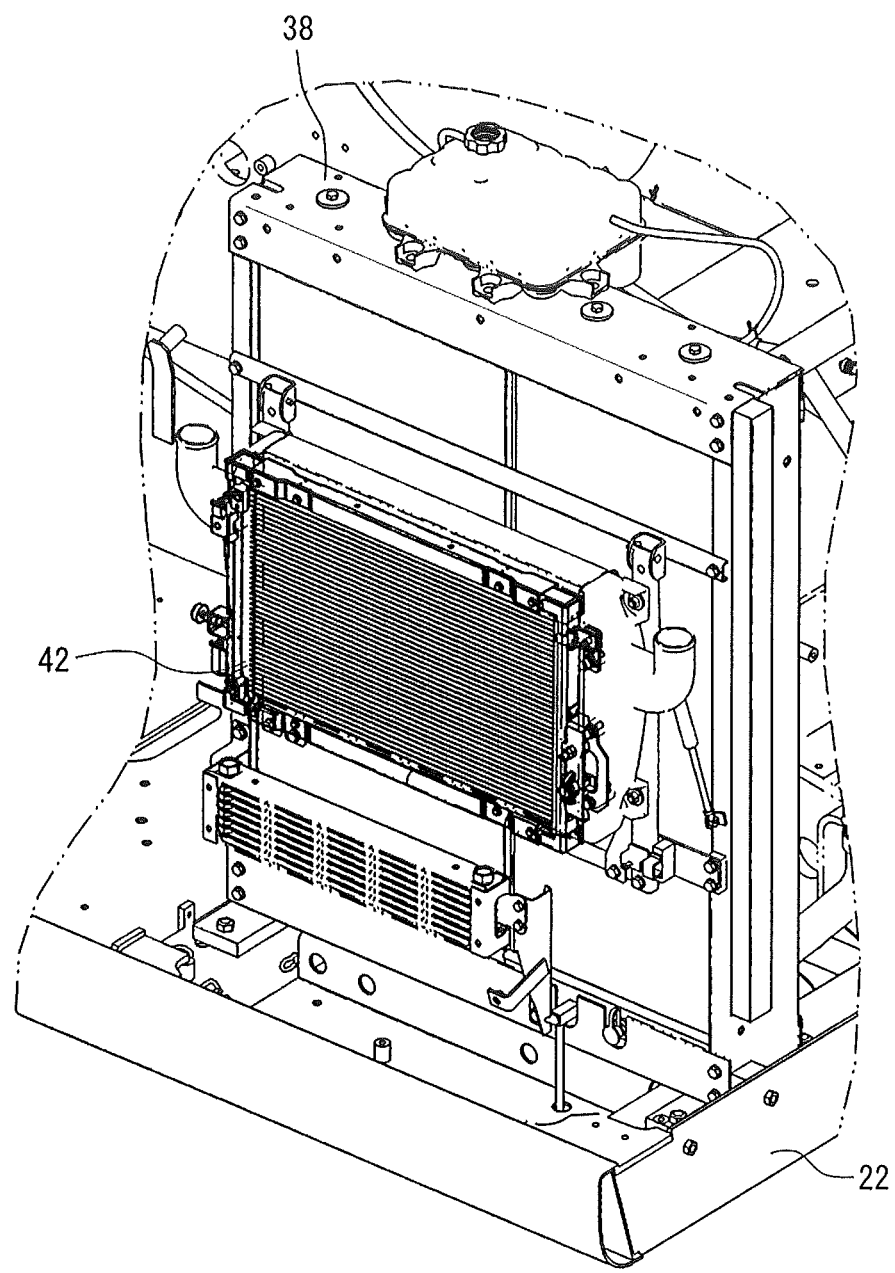
FIG. 3 is a perspective view showing a part of the upper swivel body from the direction of A shown in FIG. 2.

The present invention is further described with reference to FIGS. 2 and 3. The hydraulic excavator 2 is equipped with an air conditioner for the cab 24, in which the air conditioner is configured with an exterior unit disposed inside the equipment room 26 and an interior unit disposed inside the cab 24. The exterior unit has a compressor 40 for compressing a refrigerant, a condenser 42 for condensing the refrigerant compressed by the compressor 40, and a receiver 44 for storing the refrigerant condensed by the condenser 42. The compressor 40 and the condenser 42 are connected to each other by a pipe, and the condenser 42 and the receiver 44, too, are connected to each other by a pipe. The pipes are each configured with a hose made mainly out of a rubber material and a coupling that is clamped to each end of the hose and made of an appropriate metal such as aluminum or copper, wherein the couplings are screwed to the equipment such as the compressor 40, thereby connecting the pipes. The compressor 40 is disposed in the engine 36 and driven by the engine 36. As shown in FIG. 3, the condenser 42 is provided inside the equipment room 26 along with the radiator 38 and cools and condenses the high-temperature, high-pressure refrigerant transferred from the compressor 40. The condenser 42 has a small tube for allowing the passage of the refrigerant and a plurality of radiation fins disposed in the small tube, wherein the refrigerant inside the condenser 42 is cooled by the airflow generated by the cooling fan of the engine 36, along with the engine coolant inside the radiator 38. The receiver 44, disposed on the side of the radiator 38, stores the refrigerant transferred from the condenser 42 and removes the moisture content of the refrigerant.

The interior unit is disposed at a rear portion of an upper surface of the floor plate 30 of the cab 24 and has a casing 46 that is provided internally with an expansion valve 48 for expanding the high-pressure liquid refrigerant transferred from the receiver 44, an evaporator 50 for evaporating the refrigerant expanded by the expansion valve 48, and the like. The expansion valve 48 is disposed at a position above the upper surface of the floor plate 30 of the cab 24 and attached to the casing 46. The expansion valve 48 is connected to the receiver 44 by a supply pipe 52 that supplies, from the exterior unit to the interior unit, the refrigerant condensed by the condenser 42 and stored in the receiver 44. The expansion valve 48 is also connected to the compressor 40 by a discharge pipe 54 that discharges the refrigerant evaporated by the evaporator 50 from the interior unit to the exterior unit. The supply pipe 52 and the discharge pipe 54 are each configured with a hose made mainly out of a rubber material and a coupling that is clamped to each end of the hose and made of an appropriate metal such as aluminum or copper, wherein the couplings are screwed to the equipment such as the expansion valve 48, thereby connecting the pipes. The refrigerant that is transferred from the receiver 44 to the expansion valve 48 through the supply pipe 52 is sprayed into the evaporator 50 in the form of low-pressure mist by the expansion valve 48. Furthermore, in the evaporator 50 the refrigerant absorbs the heat of air taken in from the outside the cab 24 or air taken in from the inside of the cab 24 as vaporization heat, thereby cooling the air. A blower of the interior unit releases the resultant cooled air into the cab 24 through a duct disposed inside the cab 24. As a result, the inside of the cab 24 is cooled. The refrigerant that is evaporated by the evaporator 50 and absorbs the heat of the air is transferred from the expansion valve 48 to the compressor 40 through the discharge pipe 54.

Figure 4:
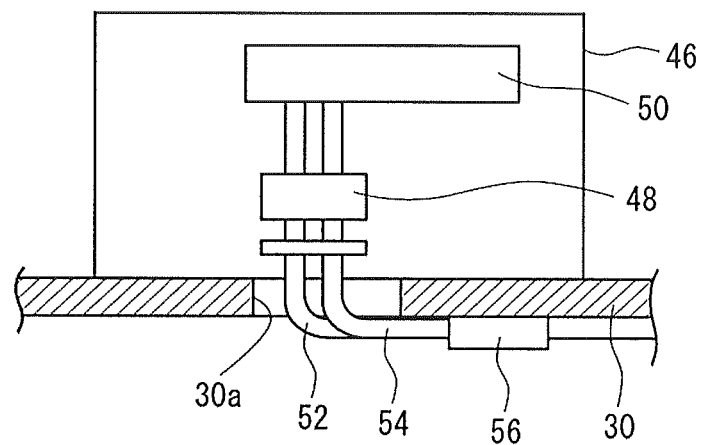
FIG. 4 is a side view showing a part of the upper swivel body from the direction of B shown in FIG. 1.

As shown in FIG. 4, a passage opening 30a through which the supply pipe 52 and the discharge pipe 54 pass is formed in the floor plate 30 of the cab 24. The supply pipe 52 and the discharge pipe 54 extend under the floor plate 30 along a bottom surface of the floor plate 30, bend upward at the passage opening 30a and pass through the passage opening 30a. The supply pipe 52 and the discharge pipe 54 are then connected to the expansion valve 48 at the position above the upper surface of the floor plate 30. The bottom surface of the floor plate 30 is provided with latching means 56 in proximity to the passage opening 30a, and the supply pipe 52 and the discharge pipe 54 are latched by the latching means 56. The latching means 56 is configured with, for example, a P-clip or the like that is tightened to the bottom surface of the floor plate 30 by bolts.

The effects of the foregoing air conditioner for the hydraulic excavator 2 shown in FIGS. 1 to 4 are now described. In the air conditioner according to the present invention, the expansion valve 48 is disposed at a position above the upper surface of the floor plate 30 of the cab 24 and connected to the exterior unit by the supply pipe 52 for supplying the refrigerant condensed at the condenser 42 from the exterior unit to the interior unit and the discharge pipe 54 for discharging the refrigerant evaporated at the evaporator 50 from the interior unit to the exterior unit. In addition, the passage opening 30a through which the supply pipe 52 and the discharge pipe 54 pass is formed in the floor plate 30, and the supply pipe 52 and the discharge pipe 54 extend under the floor plate 30 along the bottom surface of the floor plate 30, bend upward at the passage opening 30a and pass through the passage opening 30a. Furthermore, the floor plate 30 is provided with the latching means 56 in proximity to the passage opening 30a, and the supply pipe 52 and the discharge pipe 54 are latched by the latching means 56. According to such a configuration, without having a block flange between the expansion valve 48 and the supply and discharge pipes 52 and 54, necessary durability of the supply pipe 52 and the discharge pipe 54 can be ensured. Moreover, the manufacturing cost of the construction machine can be reduced because such a block flange is not required.

In the air conditioner according to the present invention, because the supply pipe 52 and the discharge pipe 54 bend upward at the passage opening 30a and pass through the passage opening 30a, the distance of protrusion of the bent portions of the supply pipe 52 and the discharge pipe 54 from the bottom surface of the floor plate 30 is reduced. This configuration prevents the supply pipe 52 and the discharge pipe 54 from interfering with the equipment and members under the floor plate 30 when vibrations and the like occur as a result of the activation of the hydraulic excavator 2, preventing interference-related damage.

It should be noted that the foregoing embodiment is an example of the present invention. The present invention is not limited to the foregoing configuration and can be modified in various ways. For instance, although the embodiment has described an example in which the compressor is driven by the engine, the compressor may be driven electrically. In such a case, the compressor does not have to be disposed in the engine as described in the embodiment and can be disposed at an appropriate position in the upper swivel body.

Also, although the embodiment has described an example in which the condenser is provided inside the equipment room along with the radiator and the refrigerant in the condenser is cooled by the cooling fan of the engine along with the engine coolant of the radiator, the condenser itself may have an electrically driven fan for cooling the refrigerant inside the condenser. In this case, the condenser does not have to be disposed inside the equipment room as described in the embodiment and can be disposed at an appropriate position in the upper swivel body.

The embodiment has also described an example in which the condenser and the receiver are separate units and connected to each other by a pipe. However, the condenser and the receiver may be integrated into a subcooling condenser. In this case, the expansion valve is connected to the subcooling condenser by a supply pipe.

The invention claimed is:

1. An air conditioner for a construction machine having a cab with a lower part closed with a floor plate, the air conditioner comprising:
   an exterior unit disposed outside the cab; and
   an interior unit disposed inside the cab on an upper surface of the floor plate,
   wherein the exterior unit includes a compressor for compressing a refrigerant, and a condenser for condensing the refrigerant compressed by the compressor,
   the interior unit includes an expansion valve that expands the refrigerant condensed by the condenser, and an evaporator that evaporates the refrigerant expanded by the expansion valve,
   the expansion valve being disposed at a position above an upper surface of the floor plate and connected to the exterior unit by a supply pipe for supplying the refrigerant condensed by the condenser from the exterior unit to the interior unit and a discharge pipe for discharging the refrigerant evaporated by the evaporator from the interior unit to the exterior unit,
   the floor plate has a passage opening through which the supply pipe and the discharge pipe pass, the supply pipe and the discharge pipe extending under the floor plate along a bottom surface of the floor plate, bending upward at the passage opening and passing through the passage opening, and
   the floor plate is provided with latching means in proximity to the passage opening to latch the supply pipe and the discharge pipe.

2. The air conditioner of claim 1, wherein at least the supply pipe comprises a hose made mainly of a rubber material and a metal coupling clamped to an end of the hose and screwed into the expansion valve.

* * * * *